(12) United States Patent
Nallaperumal et al.

(10) Patent No.: US 11,929,067 B2
(45) Date of Patent: Mar. 12, 2024

(54) CONTROLLING HOME AUTOMATION DEVICES THROUGH SECURITY PANEL USING VOICE ASSISTANT

(71) Applicant: Carrier Corporation, Palm Beach Gardens, FL (US)

(72) Inventors: Pirammanayagam Nallaperumal, Telangana (IN); Vijayakumar Ummadisinghu, Andhra Pradesh (IN); Srikanth Govindavaram, Andhra Pradesh (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 648 days.

(21) Appl. No.: 17/056,260

(22) PCT Filed: May 7, 2019

(86) PCT No.: PCT/US2019/031058
§ 371 (c)(1),
(2) Date: Nov. 17, 2020

(87) PCT Pub. No.: WO2019/226334
PCT Pub. Date: Nov. 28, 2019

(65) Prior Publication Data
US 2021/0217415 A1  Jul. 15, 2021

(30) Foreign Application Priority Data
May 25, 2018  (IN) .............................. 201811019615

(51) Int. Cl.
*G10L 15/22* (2006.01)
*G10L 13/02* (2013.01)
*H04L 12/28* (2006.01)

(52) U.S. Cl.
CPC .............. *G10L 15/22* (2013.01); *G10L 13/02* (2013.01); *H04L 12/2816* (2013.01)

(58) Field of Classification Search
None
See application file for complete search history.

(56) References Cited

U.S. PATENT DOCUMENTS 6,756,998 B1  6/2004  Bilger
7,136,709 B2  11/2006  Arling et al.
(Continued)

FOREIGN PATENT DOCUMENTS

EP  3068078 A1  9/2016
WO  2017165124 A1  9/2017
WO  2018005334 A1  1/2018

OTHER PUBLICATIONS

Abdelrazik, Dina, "Enabling Voice in the Smart Home" Parks Associates, ULE Alliance, date unknown, 15, Pages.
(Continued)

*Primary Examiner* — Jonathan C Kim
(74) *Attorney, Agent, or Firm* — CANTOR COLBURN LLP

(57) ABSTRACT

A security panel for controlling home automation devices via a voice assistant device is provided, in which the security panel includes a processor, a memory, a microphone, and a speaker. In one example implementation, the security panel is configured to receive a text input from a user, convert the text input into an audio format via a text-to-speech engine to generate a first voice command for controlling one or more home automation devices via a voice assistant device, and to output the first voice command via the speaker of the security panel, in which the first voice command is received by the voice assistant device via a microphone of the voice assistant device, in which the voice assistant device is (Continued)

configured to control the one or more home automation devices based on the first voice command.

17 Claims, 4 Drawing Sheets

(56) References Cited

U.S. PATENT DOCUMENTS

| | | |
|---|---|---|
| 7,349,682 B1 | 3/2008 | Bennett, III et al. |
| 7,464,035 B2 | 12/2008 | Funk et al. |
| 7,551,071 B2 | 6/2009 | Bennett, III et al. |
| 8,042,048 B2 | 10/2011 | Wilson et al. |
| 9,368,009 B2 | 6/2016 | Lee et al. |
| 9,860,076 B2 | 1/2018 | Warren |
| 9,929,873 B2 | 3/2018 | Hwang et al. |
| 2014/0278366 A1* | 9/2014 | Jacob ................... G10L 15/30 704/235 |
| 2015/0003779 A1 | 1/2015 | Kushiyama et al. |
| 2016/0155443 A1* | 6/2016 | Khan ..................... G06F 3/167 704/275 |
| 2016/0225240 A1 | 8/2016 | Voddhi et al. |
| 2017/0092270 A1* | 3/2017 | Newendorp ....... H04N 21/4394 |
| 2017/0163943 A1 | 6/2017 | Du et al. |
| 2017/0357478 A1* | 12/2017 | Piersol .................. G06F 3/167 |
| 2017/0359188 A1 | 12/2017 | Lett |
| 2018/0321905 A1* | 11/2018 | Fountaine .............. G06F 3/165 |
| 2019/0139548 A1* | 5/2019 | Dillard ..................... H04K 1/02 |
| 2021/0043332 A1* | 2/2021 | Rohrbacher ........... G06F 3/167 |
| 2021/0217415 A1* | 7/2021 | Nallaperumal ..... H04L 12/2816 |

OTHER PUBLICATIONS

International Search Report and Written Opinion for Application No. PCT/US2019/031058; dated Aug. 9, 2019; 15, Pages.
Unknown, "Voice Recognition Is the Latest Advancement in Home Automation" Audio Video Environments, Oct. 2016, 3 Pages.

* cited by examiner

CONTROLLING HOME AUTOMATION DEVICES THROUGH SECURITY PANEL USING VOICE ASSISTANT

CROSS-REFERENCE TO RELATED APPLICATIONS

This application is a 371 U.S. National Stage application of PCT/US2019/031058, filed May 7, 2019, which claims the benefit of Indian Application No. 201811019615, filed May 25, 2018, both of which are incorporated by reference in their entirety herein.

BACKGROUND

The present invention relates to the field of security systems, and more specifically, security panels for indirectly controlling home automation devices.

Recently, several voice-controlled personal assistant devices and/or software applications have been utilized to automate the operation of certain devices within the home. For example, some voice assistant devices such as Amazon Echo, Google Home, and Apple Siri have been utilized to automate the control of devices such as thermostats, air conditioning systems, light bulbs, and garage doors. Voice assistant devices typically include virtual personal assistant software which is a software agent that performs tasks or services for a user through interactions with the user via speech and applies natural language processing.

Security panels are often used in the home to control a home system such as a home security and/or safety system. Some home security and/or safety systems are integrated with certain security and safety devices, such as fire detectors, security cameras, and motion detectors, in which the system communicates with the devices over wireless or wired connection (e.g., Wi-Fi, Bluetooth, Ethernet, cloud, coaxial cable, etc.). Presently, to control some smart home automation devices, integration between the security panel and a voice assistant may be required. However, programming a security panel to be compatible with newly developed voice assistant devices can be a difficult task as it may require programming and/or updating firmware of the security panel to be compatible with each newly developed voice assistant device that comes to market.

Moreover, to render a security panel to be compatible with a voice assistant device, the security panel may in some situations need to be connected to the voice assistant device via a wireless or wired connection (e.g., Wi-Fi, Bluetooth, Ethernet, cloud, coaxial cable, etc.), need to be programmed to identify what smart home automation devices are connected or connectable to certain voice assistant devices, and/or need to be programmed to learn the syntax and structure of commands that can be understood by the voice assistant device to control the various smart home automation devices that are associated with the voice assistant device. The communication is typically over wireless or wired connection (e.g., Wi-Fi, Bluetooth, Ethernet, cloud, etc.).

Embodiments of the present invention provide a computer-implemented method for controlling one or more home automation devices via a security panel, wherein the security panel includes a processor, a memory, a microphone, and a speaker. A non-limiting example of the computer-implemented method includes receiving, by a security panel, a text input from a user for controlling the one or more home automation devices via a voice assistant device, in which the text input is generated by the user via a computing device associated with the user. The method includes converting, by the security panel, the text input into an audio format via a text-to-speech engine to generate a first voice command for controlling the one or more home automation devices via the voice assistant device. The method includes outputting, via the speaker of the security panel, the first voice command, in which the first voice command is received by the voice assistant device via a microphone of the voice assistant device, wherein the voice assistant device is configured to control the one or more home automation devices based on the first voice command.

Embodiments of the present invention provide a security panel for controlling home automation devices via a voice assistant device, in which the security panel includes, among other things, a microphone, a speaker, a memory and a processor, in which the processor is operatively coupled to the microphone, speaker and memory and is configured to perform a method. A non-limiting example of the computer-implemented method includes receiving a text input from a user for controlling the one or more home automation devices via the voice assistant device, in which the text input is generated by the user via a computing device associated with the user. The method includes converting the text input into an audio format via a text-to-speech engine to generate a first voice command for controlling the one or more home automation devices via the voice assistant device. The method includes outputting, via the speaker of the security panel, the first voice command, in which the first voice command is received by the voice assistant device via a microphone of the voice assistant device, in which the voice assistant device is configured to control the one or more home automation devices based on the first voice command.

Embodiments of the invention provide a computer program product controlling one or more home automation devices via a security panel, the computer program product comprising a computer readable storage medium having program instructions embodied therewith. The program instructions are executable by a system having one or more processors of the security panel to cause the security panel to perform a method. A non-limiting example of the computer-implemented method includes receiving a text input from a user for controlling the one or more home automation devices via the voice assistant device, in which the text input is generated by the user via a computing device associated with the user. The method includes converting the text input into an audio format via a text-to-speech engine to generate a first voice command for controlling the one or more home automation devices via the voice assistant device. The method includes outputting, via the speaker of the security panel, the first voice command, in which the first voice command is received by the voice assistant device via a microphone of the voice assistant device, in which the voice assistant device is configured to control the one or more home automation devices based on the first voice command.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
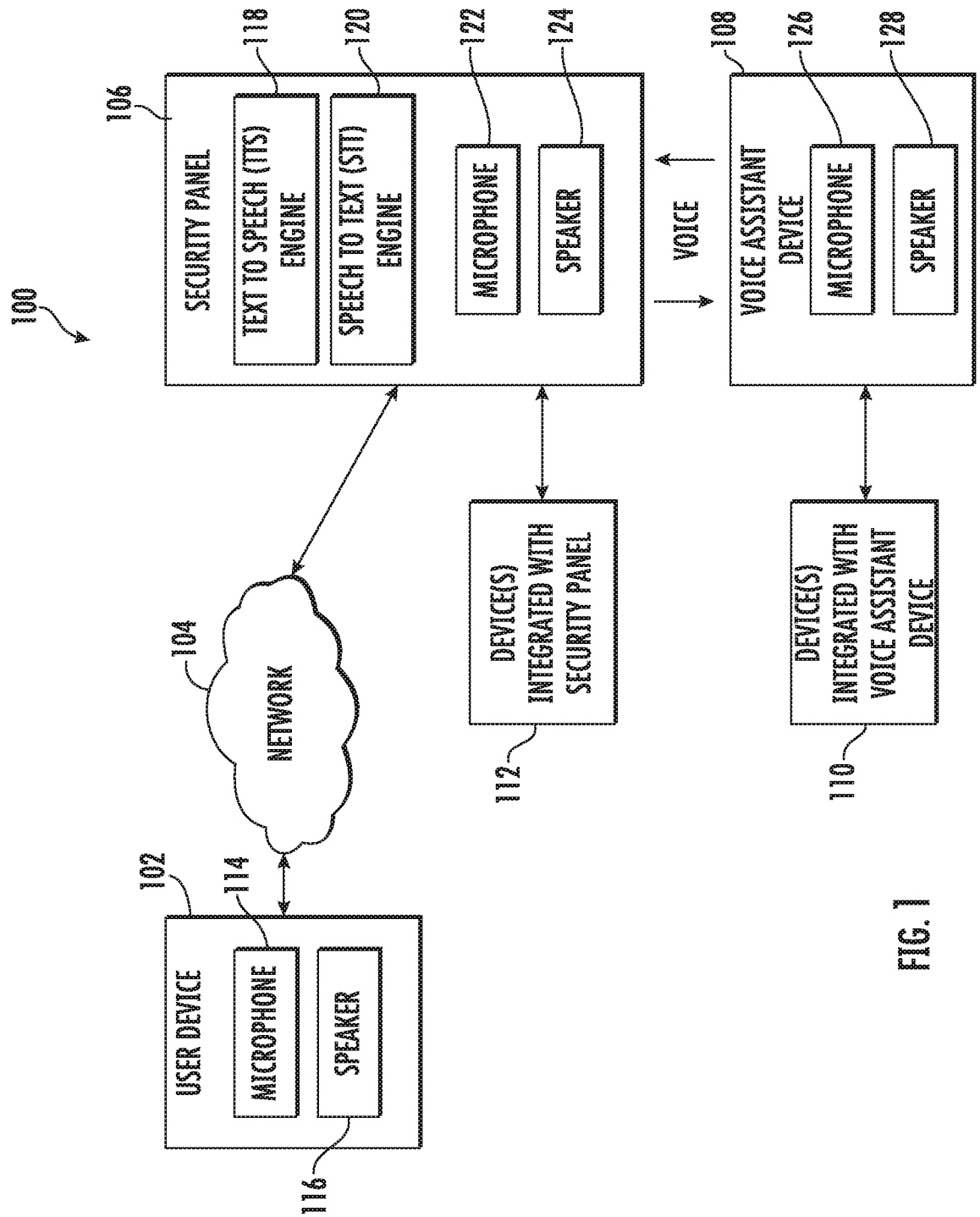
FIG. 1 depicts an example distributed system in accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted, or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two-digit or three-digit reference numbers. With minor exceptions, the leftmost digit(s) of each reference number correspond to the figure in which its element is first illustrated.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

Additionally, the term "exemplary" is used herein to mean "serving as an example, instance, or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

FIG. 1 illustrates a block diagram of an example distributed system 100 for controlling home automation devices through a security panel via a voice assistant device in accordance with one or more embodiments of the present invention. System 100 includes a user device 102, a network 104, security panel 106, a voice assistant device 108, and one or more devices (e.g., home automation devices) 110 that are integrated with the voice assistant device 108 but not with security panel 106.

In some embodiments of the present invention, the one or more devices 110 integrated with the voice assistant device 108 includes at least one of a door lock, a thermostat, a television, an air conditioning unit, a garage door opener, a lighting source, and/or other home automation device, in which voice assistant device 108 is configured to communicate with the home automation devices 110 over a wireless or wired connection (e.g., Wi-Fi, Bluetooth, Ethernet, cloud, coaxial cable, etc.), in which the security panel 106 is not configured to communicate with the one or more devices 110 over at least one of a wired or wireless connection. In some embodiments of the present invention system 100 further includes one or more devices 112 that are integrated with security panel 106 to perform one or more security and or safety operations. In some embodiments of the present invention, the one or more devices 112 integrated with security panel 106 includes at least one of a fire detector, a door lock, a security camera, a motion detector, and/or another device, in which security panel 106 is configured to communicate with the one or more devices 112 over wireless or wired connection (e.g., Wi-Fi, Bluetooth, Ethernet, cloud, coaxial cable, etc.).

As used herein, the phrase "devices that are integrated with the security panel" and the like, generally refer to devices that a security panel is programmed to directly control over a network and/or communication channel such as via a wired or wireless communication without interfacing through a voice assistant device. As used herein, the phrase "devices that are integrated with the voice assistant device" and the like, generally refer to devices that a voice assistant device is programmed to directly control over a network and/or communication channel, in which a security panel is not programmed to directly control the devices over a network or communication channel.

In general, security panel 106 is configured to control one or more home automation devices 110 that are integrated with voice assistant device 108, in which the home automations devices would otherwise not be controllable via the security panel as home automation devices 110 are not integrated with the security panel. In particular, security panel 106 is configured to receive a command from a user via user device 102 that is associated with the user, in which the command is generated by the user with the intent that the command be received by voice assistant device 108 to control one or more home automation devices 110. The command in is received by the security panel 106 in the form of text and/or audio data. Security panel 106 then generates and outputs a voice command (e.g., vocalized audio) through a speaker of security panel 106 based on the received command. For example, if the command received from the user is in a text format, security panel 106 may convert the command from text into audio using a text-to-speech engine and then output the audio through a speaker of security panel 106. If the command from the user is received in an audio format (e.g., vocalized speech from the user), security panel 106 may relay the audio to voice assistant device 108 by outputting the audio via the speaker of security panel 106. Voice assistant device 108 is configured to receive the outputted audio via a microphone of voice assistant device 108 and to control one or more home automation devices 110 based on the outputted audio command.

For example, if a user wishes to change the temperature of a Nest thermostat that is integrated with an Amazon Echo device, the user may transmit a message in text form to security panel 106 that states "Alexa, set the temperature downstairs to 72 degrees." Other suitable combinations of words or phrases may be included by the user to control one or more home automation devices 110. The message may also be transmitted in audio form from user device 102 of the user to security panel 106. For example, the user may capture his/her speech via a microphone of user device 102 and then transmit the message in audio form to security panel 106 over a wired and/or wireless connection. Security panel 106 would then output the message in audio form so that it may be received by voice assistant device 108, in which voice assistant device 108 is within audible reach of security panel 106 (e.g., within the same building, within the same floor, within a predetermined distance from voice assistant device 108). As security panel 106 is configured to output vocalized speech from the words that were spoken and/or typed by the user, security panel 106 need not be specifically programmed to learn the syntax and/or structure of commands that can be understood by a particular voice assistant device. In some embodiments of the present invention, security panel 106 is configured to relay back to the user any response that is generated by voice assistant device 108. In this way, in some embodiments of the present invention, security panel 106 acts as a go-between for relaying communications between the user and voice assistant device 106.

There are several technical benefits that stem from security panel 106 acting as a go-between for communication between a user of security panel 106 and voice assistant device 108. For example, if a user is presently located outside their home and/or is presently located within the home but is at a distance that is outside the audible listening range of a voice assistant device, the user may be able to indirectly communicate with the voice assistant device via vocalized speech that is outputted by the security panel and received by the voice assistant device. As a computing device associated with the user may already include software for communicating with the security panel to control various security and or safety operations (e.g., a software application executing a mobile device of the user, which is configured to communicate with a security panel to arm and/or disarm a security system), the software can be readily adapted to communicate text and/or audio data to security panel 106, which in turn relays the communication to voice assistant device 106.

Moreover, in some embodiments of the present invention, as security panel 106 may have previously authenticated the user prior to allowing the user to perform certain security and/or safety operations, security panel 106 may be further configured to allow remote commands to be given to voice assistant device 108 in an authenticated manner. For example, in some embodiments of the present invention, security panel 106 is configured to authenticate the user prior to outputting any voice command to voice assistant device 108. The authentication of the user assists in insuring that the user is in fact a user who is authorized to access the security system. In some embodiments of the present invention, the user is authenticated by security panel 106 by receiving and validating credentials that are provided by the user via user device 102 (e.g., user name or password that is provided by user via user device 102). In some embodiments of the present invention, the user is authenticated by security panel 106 by confirming the identity of the user via biometric data, such as by matching a known voiceprint of the user to audio that is captured via a microphone of user device 102. In some embodiments of the present invention, authentication is required based on what command is inputted by the user. For example, in some embodiments of the present invention, security panel 106 is configured to ask the user for authentication on as needed basis (e.g., when a particular command is received from the user).

With respect to FIG. 1, as noted above, user device 102 includes a microphone 114 and a speaker 116. Security panel 106 includes a text-to-speech (TTS) engine 118, a speech-to-text (STT) engine 120, a microphone 122, and a speaker 124. Voice assistant device 108 includes a microphone 126 and a speaker 128. Security panel 106 and/or voice assistant device 108 may each include internal and external hardware components, such as those depicted and described above with respect to FIG. 1.

FIG. 1 provides an illustration of only one example system and does not imply any limitation with regard to other systems in which different embodiments of the present invention may be implemented. Various suitable modifications to the depicted environment may be made, by those skilled in the art, without departing from the scope of the invention as recited by the claims.

User device 102 is configured to allow users to access security panel 106 and to provide at least one of a text and/or audio input for controlling one or more devices 110 (e.g. home automation devices) that are integrated with the voice assistant device 108. For example, in some embodiments of the present invention, user device 102 is configured to receive a text input from the user via a keyboard of user device 102, in which the text is generated by the user for controlling one or more devices 110 that are integrated with the voice assistant device 108. The text input is then transmitted by user device 102 to security panel 106. In some embodiments of the present invention, user device 102 is configured to capture audio from the user via microphone 114 and to transmit the audio to security panel 106 over a wired or wireless connection (e.g., Wi-Fi, Bluetooth, Ethernet, cloud, coaxial cable, etc.).

In some embodiments of the present invention, user device 102 is a laptop computer, a tablet computer, a netbook computer, a personal computer (PC), a desktop computer, a personal digital assistant (PDA), a smart phone, or other suitable programmable electronic device capable of communicating with various components and devices within distributed system. In some embodiments of the present invention, user device 102 is a programmable electronic mobile device or a combination of programmable electronic mobile devices capable of executing machine readable program instructions and communicating with other computing devices (not shown) within distributed system 100. In some embodiments of the present invention, user device 102 may include internal and external hardware components, such as those depicted and described above with respect to FIG. 1.

As noted above, in some embodiments of the present invention, security panel 106 is configured to receive a text input from user device 102 for controlling one or more home automation devices 110 via voice assistant device 108. In some embodiments of the present invention, security panel 106 is configured to covert the text input into an audio format via text-to-speech engine (TTS) 118 to generate a first voice command (e.g., vocalized speech) for controlling the one or more home automation devices 110 via the voice assistant device 108. TTS 118 is configured to synthesize speech from text input for playback through speaker 124 of security panel 106. In particular, security panel 106 is configured to output the first voice command via speaker 124 such the first voice command may be received by voice assistant device 108. Voice assistant device 108 is configured to receive the first voice command via microphone 126 and then to process the first voice command to control the one of more of the home automation devices 110 in accordance with the first voice command.

In some embodiments of the present invention, voice assistant device 108 is further configured to output a first voice response via speaker 128 in response to the control of the one or more home automation devices 110 based on the first voice command. In some embodiments of the present invention, security panel 106 is configured to receive the first voice response from voice assistant device 108 via microphone 122 of security panel 106. Security panel 106 is configured to then relay the first voice response in a text or audio format to the user device 102. For example, in some embodiments of the present invention, security panel 106 is configured to convert the first voice response into a text format via speech-to-text engine (STT) engine 120 to generate a first text response. STT engine 120 is configured to receive a voice response (e.g., vocalized speech) from voice assistant device 108 and to generate a transpiration from the voice response to create a text message that corresponded to the received voice response. Various suitable types of speech-to-text algorithms or APIs may be used as known to those having skill in the art In some embodiments of the present invention, alternatively or in addition to being configured to receive a text input, security panel 106 is configured to receive a voice input from user device 102 for controlling one or more home automation devices 110 via voice assistant device 108, in which the voice input includes a second voice command (e.g., vocalized speech). In contrast with the first voice command, the second voice command is not generated by security panel 106 but rather is provided by the user via user interface 102, in which user interface 102 is configured to capture speech of the user via microphone 114 of user device 102. Security panel 106 is configured to relay the second voice command by outputting the received voice input (e.g., the second voice command) via speaker 124 of security panel 106. Voice assistant device 108 is configured to receive the second voice command via microphone 126 and then to process the second voice command to control the one of more of the home automation devices 110 in accordance with the second voice command.

In some embodiments of the present invention, voice assistant device 108 is further configured to output a second voice response via speaker 128 in response to the control of the one or more home automation devices 110 based on the second voice command. In some embodiments of the present invention, security panel 106 is configured to receive the second voice response from voice assistant device 108 via microphone 122 and then to relay the second voice response in a text or audio format to the user device 102. For example, in some embodiments of the present invention, security panel 106 is configured to receive the second voice response and then transmit the second voice response to the user over network 104 such that the user may playback the second voice response via speaker 116 of user device 102. In some embodiments of the present inventions, security panel 106 is configured to receive the second voice response, convert the second voice response into a text format via a STT engine 120 to generate a second text response. The second text response is then transmitted to the user via user device 102 such that the user of user device 102 may be able to read what was vocalized by voice assistant device 108 in response to the second voice command.

Network 104 can be, for example, a telecommunications network, a local area network (LAN), a wide area network (WAN), such as the Internet, or a combination of the three, and can include wired, wireless, or fiber optic connections. Network 104 can include one or more wired and/or wireless networks that are capable of receiving and transmitting data, voice, and/or video signals, including multimedia signals that include voice, data, and video information. In general, network 104 can be any suitable combination of connections and protocols that can support communications between user device 102, security panel 106, and/or other computing devices (not shown) within a distributed system 100. In some embodiments of the present invention, distributed system 100 is implemented as part of a cloud computing environment.

In some embodiments of the present invention, security panel 106 is a standalone computing device that can be (or is) attached to a wall or surface of a building (e.g., house, apartment, commercial offices, etc.). In some embodiments of the present invention security panel 106 is a mobile computing device, or other suitable electronic device and/or computing system capable of receiving, sending, and processing data for controlling the operation of a security system.

Figure 2:
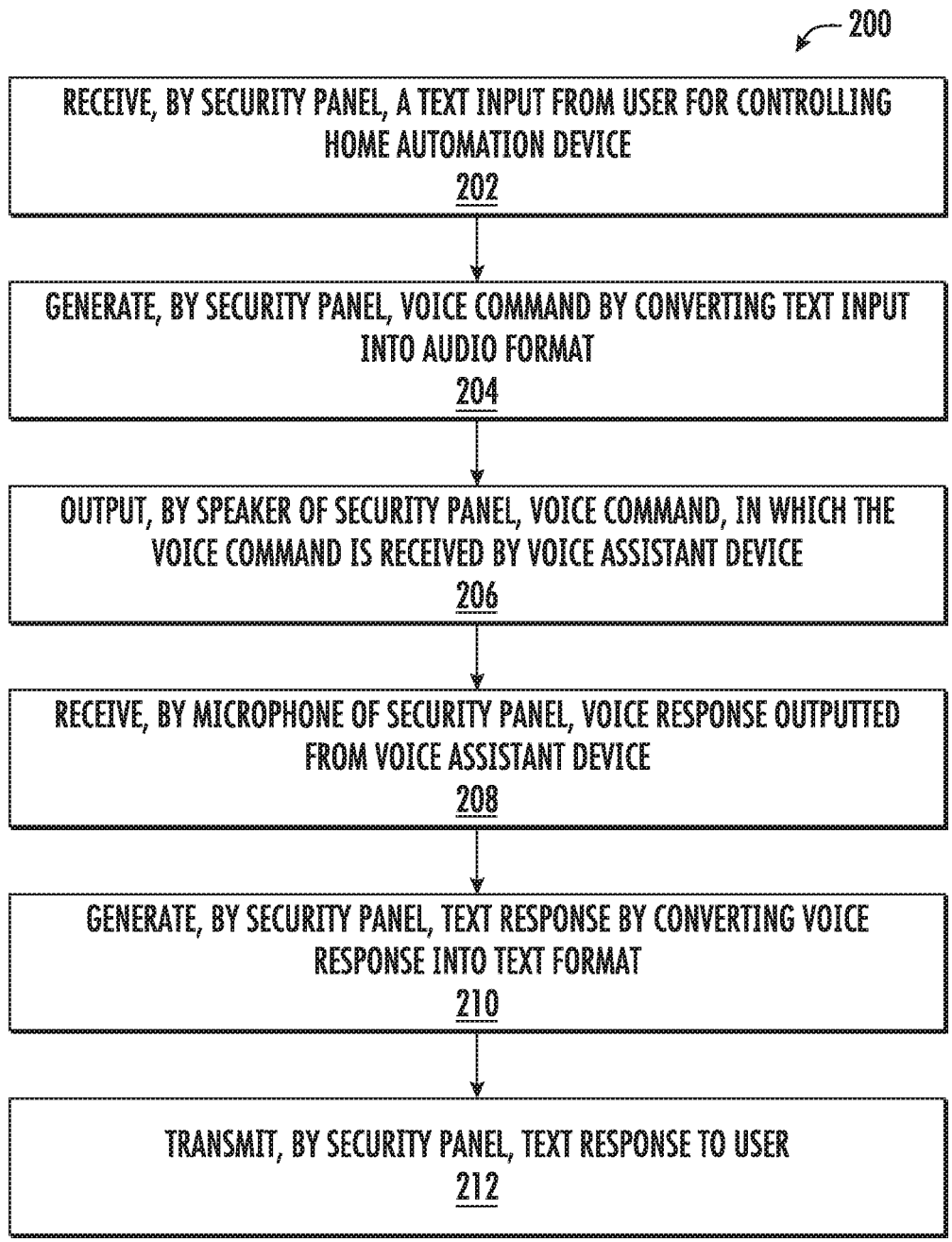
FIG. 2 depicts a flow diagram illustrating an example methodology in accordance with one or more embodiments of the present invention.

Additional details of the operation of system 100 will now be described with reference to FIGS. 2-4, wherein FIG. 2 depicts a flow diagram illustrating an example methodology 200 according to one or more embodiments of the present invention. At 202, a text input is received from a user by a security panel (e.g., received at security panel 106 from user device 102 over network 104), in which the text input is generated by the user for controlling a home automation device. At 204 a voice command is generated by the security panel, in which the voice command is generated by converting the text input into an audio format (e.g., generating vocalized speech). At 206 the voice command is outputted by a speaker of the security panel (e.g., speaker 124 of security panel 106), in which the voice command is received by a voice assistant device (e.g., voice assistant device 108).

At 208 a voice response is received by the security panel from the voice assistant device, in which the security panel receives the voice response via a microphone of the security panel (e.g., microphone 122 of security panel 106). At 210, a text response is generated by the security panel from the voice response that was received, in which the text response is generated by converting the voice response into a text format. At 212, the text response is transmitted by the security panel to the user (e.g., from security panel 106 to user device 102 over network 104).

Figure 3:
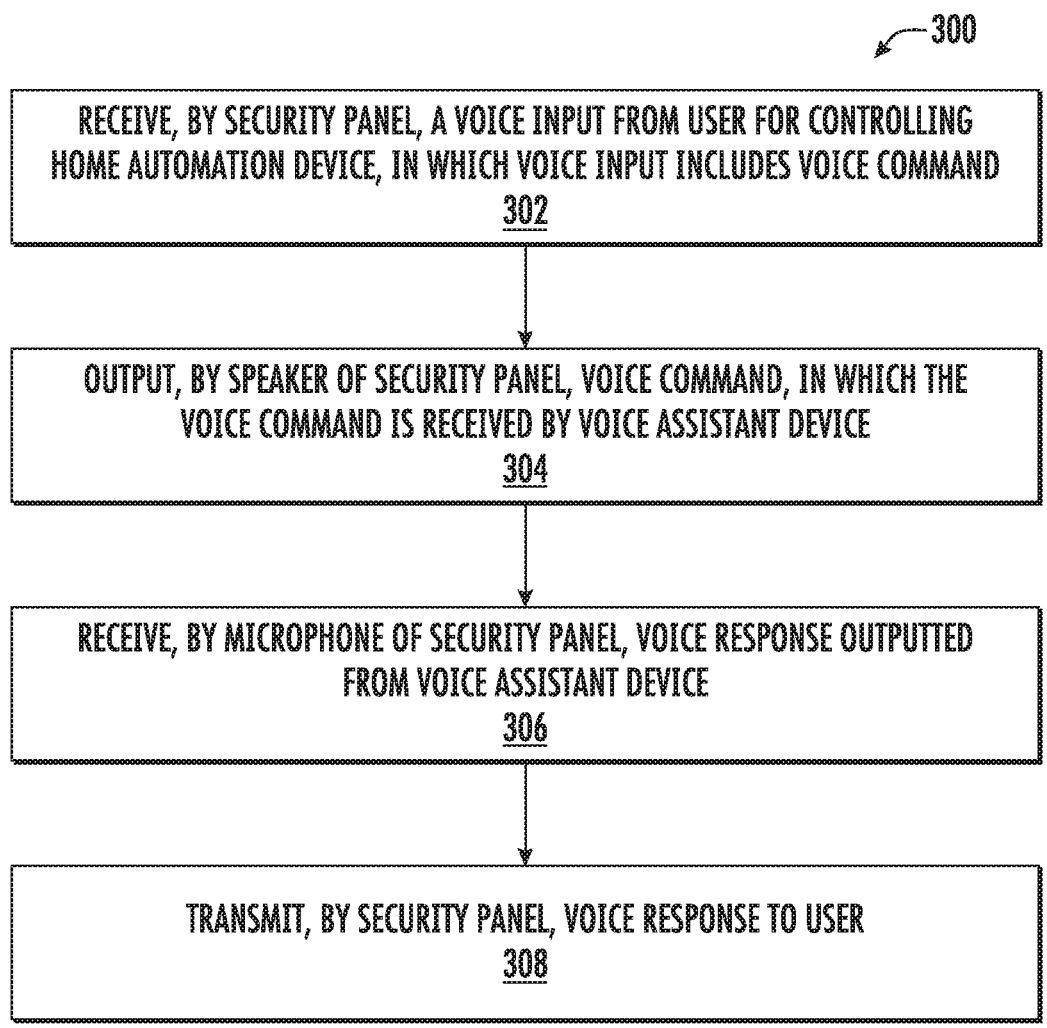
FIG. 3 depicts a flow diagram illustrating another example methodology in accordance with one or more embodiments of the present invention.

FIG. 3 depicts a flow diagram illustrating another example methodology 300 according to one or more embodiments of the present invention. At 302, a voice input is received from a user by a security panel (e.g., vocalized speech is received at security panel 106 from user device 102 over network 104), in which the voice input includes a voice command that was spoken by the user for the purpose of controlling a home automation device. At 304 the voice command is outputted by a speaker of the security panel (e.g., speaker 124 of security panel 106), in which the voice command is received by a voice assistant device (e.g., voice assistant device 108). At 306 a voice response is received by the security panel from the voice assistant device, in which the security panel receives the voice response via a microphone of the security panel (e.g., microphone 122 of security panel 106). At 308, the voice response is transmitted by the security panel to the user device (e.g., from security panel 106 to user device 102 over network 104).

In some embodiments of the present invention, the security panel is further or alternatively configured to receive an input from the user via a pressing of a button or icon via a user device (e.g., user device 102). For example, in some embodiments of the present invention, user device 102 is a key fob device, in which the user is able to select a particular home automation device operation via the key fob device. In some embodiment of the present invention, the security panel is configured to identify a pre-generated voice command that is associated with the user selected operation and then to output the pre-generated voice command via the speaker of the security panel. In some embodiments of the present invention, the pre-generated voice command comprises speech that is stored in the security panel and associated with a particular command. For example, if a user were to select a temperature control via the key fob, in some embodiment of the present invention, the security panel may output a pre-generated voice command comprising speech that instructs the voice assistant device to cause the home automation device to perform the selected operation.

In some embodiments of the present invention, the security panel is further or alternatively configured to trigger a pre-generated voice command based on detection of a particular predetermined event via an integrated device, in which the predetermined event is associated with a preconfigured home automation operation of a home automation device that is not integrated with the security panel. For example, in some embodiments of the present invention, if an alarm sensor is triggered, the security panel may output a pre-generated voice command comprising speech that instructs the voice assistant device to cause a lighting system to turn on, in which the alarm sensor is integrated with the security panel whereas the lighting system is integrated with the voice assistant device but not with the security panel.

Figure 4:
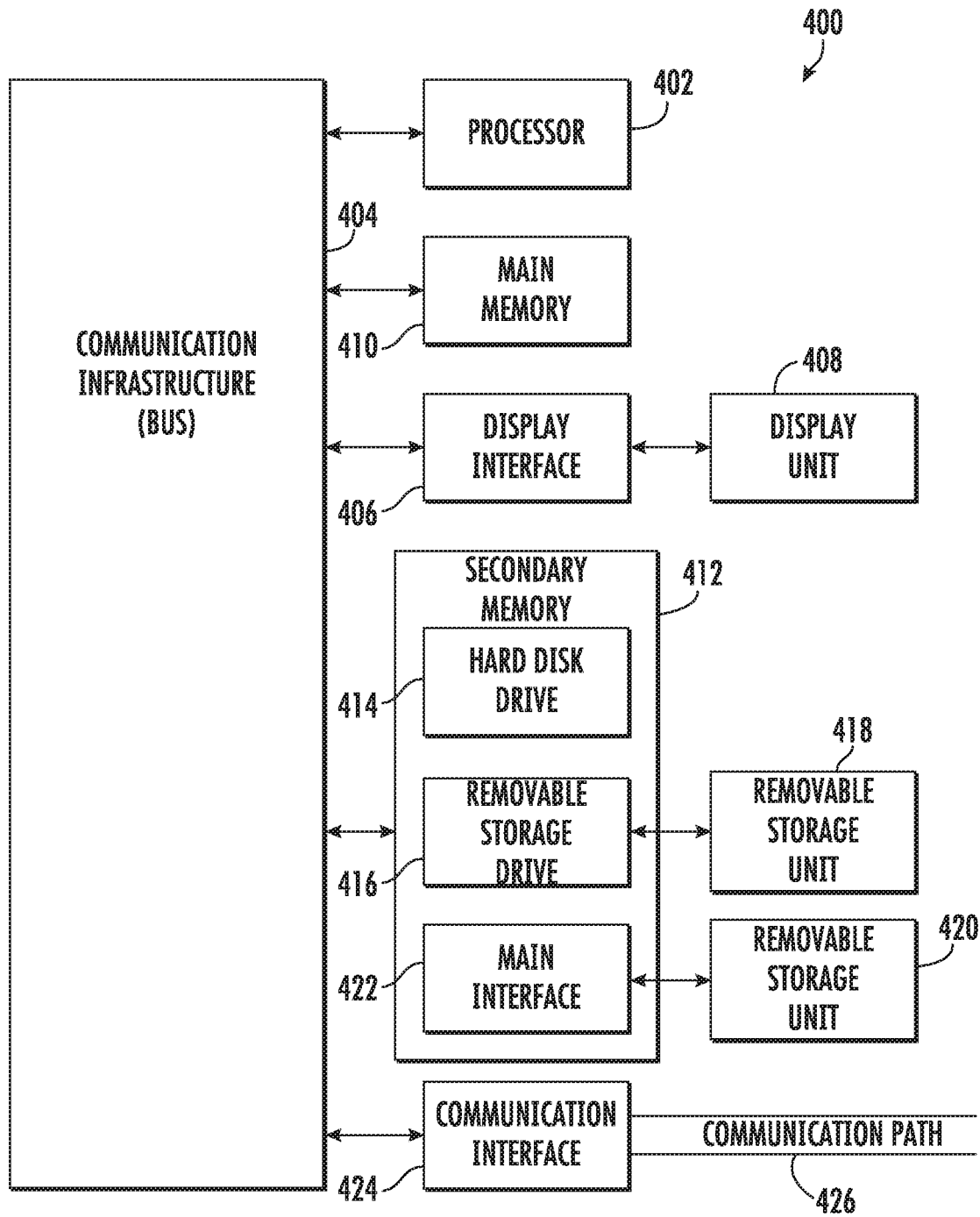
FIG. 4 depicts an exemplary computer system capable of implementing one or more embodiments of the present invention.

FIG. 4 illustrates a high level block diagram showing an example of a computer-based system 400 useful for implementing one or more embodiments of the invention, such as some of the components of the user devices, security panels, devices integrated with security panels, and devices integrated with voice assistant devices that are described herein. Although one exemplary computer system 400 is shown, computer system 400 includes a communication path 426, which connects computer system 400 to additional systems and may include one or more wide area networks (WANs) and/or local area networks (LANs) such as the internet, intranet(s), and/or wireless communication network(s). Computer system 400 and additional systems are in communication via communication path 426, (e.g., to communicate data between them).

Computer system 400 includes one or more processors, such as processor 402. Processor 402 is connected to a communication infrastructure 404 (e.g., a communications bus, cross-over bar, or network). Computer system 400 can include a display interface 406 that forwards graphics, text, and other data from communication infrastructure 404 (or from a frame buffer not shown) for display on a display unit 408. The display interface 406 can also or alternatively include one or more LEDs. Computer system 400 also includes a main memory 410, such as for example, random access memory (RAM), and may also include a secondary memory 412. Secondary memory 412 may include, for example, a hard disk drive 414 and/or a removable storage drive 416, representing, for example, a floppy disk drive, a magnetic tape drive, a USB drive, an SD card, an optical disk drive or other suitable type of removal storage media. Removable storage drive 416 reads from and/or writes to a removable storage unit 418 in a manner well known to those having ordinary skill in the art. Removable storage unit 418 represents, for example, a floppy disk drive, a magnetic tape drive, a USB drive, an SD card, an optical disk drive, etc. which is read by and written to by removable storage drive 416. As will be appreciated, removable storage unit 418 includes a computer readable medium having stored therein computer software and/or data.

In some alternative embodiments of the invention, secondary memory 412 may include other similar means for allowing computer programs or other instructions to be loaded into the computer system. Such means may include, for example, a removable storage unit 420 and an interface 422. Examples of such means may include a program package and package interface (such as that found in video game devices), a removable memory chip (such as an EPROM or PROM) and associated socket, and other removable storage units 420 and interfaces 422 which allow software and data to be transferred from the removable storage unit 420 to computer system 400.

Computer system 400 may also include a communications interface 424. Communications interface 424 allows software and data to be transferred between the computer system and external devices. Examples of communication interface 424 include, but is not limited to, a modem, a network interface (such as an Ethernet card), a communications port, or a PCM-CIA slot and card, etc. Software and data transferred via communications interface 424 are in the form of signals which may be, for example, electronic, electromagnetic, optical, or other signals capable of being received by communications interface 424. These signals are provided to communications interface 424 via communication path (i.e., channel) 426. Communication path 426 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 410 and secondary memory 412, removable storage drive 416, and a hard disk installed in hard disk drive 414. Computer programs (also called computer control logic) are stored in main memory 410, and/or secondary memory 412. Computer programs may also be received via communications interface 424. Such computer programs, when run, enable the computer system to perform the features of the present disclosure as discussed herein. In particular, the computer programs, when run, enable processor 402 to perform the features of the computer system. Accordingly, such computer programs represent controllers of the computer system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disc (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide, or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments of the invention, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A computer-implemented method for controlling one or more home automation devices via a security panel, wherein the security panel includes a processor, a memory, a microphone, and a speaker, the computer-implemented method comprising:
   receiving, by the security panel, a text input from a user for controlling the one or more home automation devices via a voice assistant device, wherein the text input is generated by the user via a computing device associated with the user;
   converting, by the security panel, the text input into an audio format via a text-to-speech engine to generate a first voice command for controlling the one or more home automation devices via the voice assistant device; and
   outputting, via the speaker of the security panel, the first voice command, wherein the first voice command is received by the voice assistant device via a microphone of the voice assistant device, wherein the voice assistant device is configured to control the one or more home automation devices based on the first voice command;
   wherein the voice assistant device is further configured to output a first voice response via a speaker of the voice assistant device in response to the control of the one or more home automation devices based on the first voice command, wherein the computer-implemented method further includes:
   receiving, via the microphone of the security panel, the first voice response;
   converting, by the security panel, the first voice response into a text format via a speech-to-text engine to generate a first text response; and
   transmitting, by the security panel, the first text response to the user.

2. The computer-implemented method of claim 1 further comprising:
   receiving, by the security panel, a voice input from the user for controlling the one or more home automation devices via the voice assistant device, wherein the voice input includes a second voice command, wherein the voice input is generated by the user via a microphone of the computing device; and
   outputting, via the speaker of the security panel, the second voice command, wherein the second voice command is received by the voice assistant device via the microphone of the voice assistant device, wherein the voice assistant device is configured to control the one or more home automation devices based on the second voice command.

3. The computer-implemented method of claim 2, wherein the voice assistant device is further configured to output a second voice response via the speaker of the voice assistant device in response to the control of the one or more home automation devices based on the second voice command, wherein the computer-implemented method further includes:
   receiving, via the microphone of the security panel, the second voice response; and
   transmitting, by the security panel, the second voice response to the user.

4. The computer-implemented method of claim 1, wherein the security panel is configured to authenticate the user prior to outputting the first voice command via the speaker of the security panel.

5. The computer-implemented method of claim 1, wherein the one or more home automation devices includes at least one of a door lock, a thermostat, a television, an air conditioning unit, a garage door opener, or a lighting device.

6. The computer-implemented method of claim 1, wherein voice assistant device is configured to communicate with the one or more home automation devices over at least one of a wired or wireless connection, wherein the security panel is not configured to communicate with the one or more home automation devices over at least one of a wired or wireless connection.

7. A security panel for controlling home automation devices via a voice assistant device, the security panel comprising:
   a microphone;
   a speaker;
   a memory; and
   a processor operatively coupled to the microphone, speaker, and memory, wherein the processor is configured to perform a method comprising:
   receiving a text input from a user for controlling the one or more home automation devices via the voice assistant device, wherein the text input is generated by the user via a computing device associated with the user;
   converting the text input into an audio format via a text-to-speech engine to generate a first voice command for controlling the one or more home automation devices via the voice assistant device; and
   outputting, via the speaker of the security panel, the first voice command, wherein the first voice command is received by the voice assistant device via a microphone of the voice assistant device, wherein the voice assistant device is configured to control the one or more home automation devices based on the first voice command;
   wherein the voice assistant device is further configured to output a first voice response via a speaker of the voice assistant device in response to the control of the one or more home automation devices based on the first voice command, wherein the method further includes:
   receiving, via the microphone of the security panel, the first voice response;
   converting, by the security panel, the first voice response into a text format via a speech-to-text engine to generate a first text response; and transmitting, by the security panel, the first text response to the user.

8. The security panel of claim 7, wherein the method further includes:
receiving, by the security panel, a voice input from the user for controlling the one or more home automation devices via the voice assistant device, wherein the voice input includes a second voice command, wherein the voice input is generated by the user via a microphone of the computing device; and
outputting, via the speaker of the security panel, the second voice command, wherein the second voice command is received by the voice assistant device via the microphone of the voice assistant device, wherein the voice assistant device is configured to control the one or more home automation devices based on the second voice command.

9. The security panel of claim 8, wherein the voice assistant device is further configured to output a second voice response via the speaker of the voice assistant device in response to the control of the one or more home automation devices based on the second voice command, wherein the method further includes:
receiving, via the microphone of the security panel, the second voice response; and
transmitting, by the security panel, the second voice response to the user.

10. The security panel of claim 7, wherein the security panel is configured to authenticate the user prior to outputting the first voice command via the speaker of the security panel.

11. The security panel of claim 7, wherein the one or more home automation devices includes at least one of a door lock, a thermostat, a television, an air conditioning unit, a garage door opener, or a lighting device.

12. The security panel of claim 7, wherein voice assistant device is configured to communicate with the one or more home automation devices over at least one of a wired or wireless connection, wherein the security panel is not configured to communicate with the one or more home automation devices over at least one of a wired or wireless connection.

13. A computer program product for controlling one or more home automation devices via a security panel, the computer program product comprising a non-transitory computer readable storage medium having program instructions embodied therewith, the program instructions executable by one or more processors of the security panel to cause the security panel to perform a method, the method comprising:
receiving a text input from a user for controlling the one or more home automation devices via a voice assistant device, wherein the text input is generated by the user via a computing device associated with the user;
converting the text input into an audio format via a text-to-speech engine to generate a first voice command for controlling the one or more home automation devices via the voice assistant device; and
outputting, via a speaker of the security panel, the first voice command, wherein the first voice command is received by the voice assistant device via a microphone of the voice assistant device, wherein the voice assistant device is configured to control the one or more home automation devices based on the first voice command;
wherein the voice assistant device is further configured to output a first voice response via a speaker of the voice assistant device in response to the control of the one or more home automation devices based on the first voice command, wherein the method further includes:
receiving, via the microphone of the security panel, the first voice response;
converting, by the security panel, the first voice response into a text format via a speech-to-text engine to generate a first text response; and
transmitting, by the security panel, the first text response to the user.

14. The computer program product of claim 13, wherein the method further includes:
receiving, by the security panel, a voice input from the user for controlling the one or more home automation devices via the voice assistant device, wherein the voice input includes a second voice command, wherein the voice input is generated by the user via a microphone of the computing device; and
outputting, via the speaker of the security panel, the second voice command, wherein the second voice command is received by the voice assistant device via the microphone of the voice assistant device, wherein the voice assistant device is configured to control the one or more home automation devices based on the second voice command.

15. The computer program product of claim 14, wherein the voice assistant device is further configured to output a second voice response via the speaker of the voice assistant device in response to the control of the one or more home automation devices based on the second voice command, wherein the method further includes:
receiving, via the microphone of the security panel, the second voice response; and
transmitting, by the security panel, the second voice response to the user.

16. The computer program product of claim 13, wherein the security panel is configured to authenticate the user prior to outputting the first voice command via the speaker of the security panel.

17. The computer program product of claim 13, wherein the one or more home automation devices includes at least one of a door lock, a thermostat, a television, an air conditioning unit, a garage door opener, or a lighting device.

* * * * *